(12) United States Patent  
Melas et al.

(10) Patent No.: US 8,924,052 B2  
(45) Date of Patent: Dec. 30, 2014

(54) LEAD LOCOMOTIVE CONTROL OF POWER OUTPUT BY TRAILING LOCOMOTIVES

(71) Applicant: Electro-Motive Diesel, Inc., Lagrange, IL (US)

(72) Inventors: Dennis John Melas, Chicago, IL (US); Andrew Joseph Shakal, Bloomer, WI (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 13/789,934

(22) Filed: Mar. 8, 2013

(65) Prior Publication Data

US 2014/0252174 A1    Sep. 11, 2014

(51) Int. Cl.
*B61C 3/00* (2006.01)
*B61C 17/12* (2006.01)

(52) U.S. Cl.
CPC ..................................... *B61C 17/12* (2013.01)
USPC .............................. 701/19; 104/88.02; 105/61

(58) Field of Classification Search
CPC .......... B61C 17/12; B61C 3/00; B61L 23/005
USPC ............. 701/19, 20; 104/88.02, 88.03, 88.04, 104/88.05, 88.06; 105/48, 61, 26.05; 318/543, 544, 546–551
See application file for complete search history.

(56) References Cited

U.S. PATENT DOCUMENTS

| | | | |
|---|---|---|---|
| 3,251,312 A * | 5/1966 | Livingston ....................... 105/61 |
| 3,287,555 A * | 11/1966 | Livingston et al. ....... 246/187 B |
| 4,266,485 A | 5/1981 | Bruner et al. |
| 4,344,364 A * | 8/1982 | Nickles et al. ............... 105/62.1 |
| 4,360,873 A | 11/1982 | Wilde et al. |
| 4,401,035 A | 8/1983 | Spigarelli et al. |
| 4,602,335 A | 7/1986 | Perlmutter |
| 4,774,669 A | 9/1988 | Schmitz et al. |
| 5,950,967 A | 9/1999 | Montgomery |
| 5,961,567 A * | 10/1999 | Azzaro et al. ..................... 701/99 |
| 6,681,161 B1 * | 1/2004 | Gordon et al. .................. 701/20 |
| 7,021,588 B2 * | 4/2006 | Hess et al. .................... 246/186 |
| 7,131,614 B2 | 11/2006 | Kisak et al. |
| 7,162,337 B2 | 1/2007 | Peltz et al. |
| 7,618,011 B2 * | 11/2009 | Oleski et al. .............. 246/167 R |
| 7,869,908 B2 | 1/2011 | Walker |
| 8,095,253 B2 | 1/2012 | Kane et al. |

(Continued)

FOREIGN PATENT DOCUMENTS

KR   1020070118043   12/2007
WO      2010008540    1/2010

*Primary Examiner* — McDieunel Marc
*Assistant Examiner* — Rodney Butler
(74) *Attorney, Agent, or Firm* — Finnegan, Henderson, Farabow, Garrett & Dunner LLP

(57) ABSTRACT

A locomotive consist control system may include a lead controller associated with a lead locomotive of the consist, and a secondary controller associated with a trailing locomotive of the consist and communicatively coupled by a communication link with the lead controller. The lead controller may be configured to receive a generator voltage or current output from a power bus electrical characteristics sensor associated with each locomotive, determine a total electrical power output requirement for the consist, determine an electrical power output requirement for each locomotive in the consist, and supply instructions to dynamically adjust an output voltage or current generated by a generator associated with each locomotive to a desired voltage or current anywhere within the rated capacity of the generator.

20 Claims, 3 Drawing Sheets

(56) References Cited

U.S. PATENT DOCUMENTS

| | | | |
|---|---|---|---|
| 8,370,007 B2* | 2/2013 | Brooks et al. | 701/20 |
| 8,500,214 B2* | 8/2013 | Smith et al. | 303/7 |
| 2004/0044447 A1* | 3/2004 | Smith | 701/19 |
| 2006/0025903 A1* | 2/2006 | Kumar | 701/19 |
| 2006/0138285 A1 | 6/2006 | Oleski et al. | |
| 2006/0266256 A1* | 11/2006 | Donnelly et al. | 105/61 |
| 2008/0082223 A1 | 4/2008 | Daum et al. | |
| 2008/0087772 A1 | 4/2008 | Smith | |
| 2008/0281477 A1 | 11/2008 | Hawthorne et al. | |
| 2009/0090818 A1* | 4/2009 | Kumar | 246/186 |
| 2010/0019718 A1* | 1/2010 | Salasoo et al. | 320/103 |
| 2010/0070116 A1* | 3/2010 | Kumar et al. | 701/19 |
| 2011/0118899 A1* | 5/2011 | Brooks et al. | 701/2 |
| 2011/0118914 A1* | 5/2011 | Brooks et al. | 701/20 |
| 2011/0270475 A1 | 11/2011 | Brand et al. | |
| 2012/0143407 A1* | 6/2012 | Murthy | 701/19 |
| 2012/0253565 A1* | 10/2012 | Kumar et al. | 701/19 |
| 2012/0310453 A1* | 12/2012 | Brooks et al. | 701/20 |
| 2012/0323412 A1* | 12/2012 | Chandra et al. | 701/19 |
| 2013/0001370 A1 | 1/2013 | Uzkan | |
| 2013/0245863 A1* | 9/2013 | Frazier et al. | 701/19 |
| 2013/0245864 A1* | 9/2013 | Frazier et al. | 701/19 |
| 2013/0268147 A1* | 10/2013 | Chundru et al. | 701/19 |

* cited by examiner

LEAD LOCOMOTIVE CONTROL OF POWER OUTPUT BY TRAILING LOCOMOTIVES

TECHNICAL FIELD

The present disclosure relates generally to a locomotive control and, more particularly, to a lead locomotive control of power output by trailing locomotives.

BACKGROUND

A train consist often includes a lead locomotive and at least one trailing locomotive. The lead locomotive, although generally located at the leading end of the consist, can alternatively be located at any other position along its length. The locomotives provide power to the rest of the consist, and the lead locomotive generates operator and/or autonomous control commands directed to components of the lead and trailing locomotives.

Communication between the lead and trailing locomotives can involve a hard-wired multi-unit (MU) cable, which signals a desired power level for the consist. The MU cable includes several wires to indicate different throttle notch settings (predefined discrete power levels). Most of these wires are binary indicators that either provide a voltage or no voltage to the wires. Although functional, this control system is inefficient because of its limited communication abilities.

One attempt to improve communication between locomotives in a consist is disclosed in U.S. Pat. No. 7,021,588 that issued to Hess, Jr. et al. on Apr. 4, 2006 ("the '588 patent"). In particular, the '588 patent describes a method for controlling a consist of at least first and second locomotives having discrete operating modes. The method comprises receiving a control command and determining a power operating mode of the first locomotive and a power operating mode of the second locomotive as a function of the control command and an optimization parameter.

Although the system of the '588 patent may have improved communication between multiple locomotives in a consist, the system may still be problematic. In particular, the system may be limited to identifying a desired operating mode based on the control command, where the desired operating mode can only be approximated by specification of a discrete notch setting. Accordingly, the system may be unable to automatically and dynamically adjust a precise electrical power output expected from each trailing locomotive in the consist to achieve desired operating parameters for the consist as a whole. For example, if the consist was operating below a desired power output at an identified throttle notch setting, the system would be unable to make finely tuned adjustments to power output by individual locomotives in the consist to reach the desired total power output while improving overall fuel efficiency for the consist.

The control system of the present disclosure solves one or more of the problems set forth above and/or other problems in the art.

SUMMARY OF THE INVENTION

In one aspect, the present disclosure is directed to a locomotive consist control system for a locomotive consist including a lead locomotive and at least one trailing locomotive. Each locomotive may include an engine, a generator, a traction motor, a power bus electrically connecting the generator to the traction motor, and a power bus electrical characteristics sensor for detecting at least one of voltage or current in the power bus. The locomotive consist control system may include a lead controller associated with the lead locomotive of the consist, and a secondary controller associated with each of the at least one trailing locomotive of the consist. The secondary controller may be communicatively coupled by a communication link with the lead controller. The lead controller may be configured to receive data from the power bus electrical characteristics sensor associated with each locomotive, and the data may include information on at least one of voltage or current being output by the generator associated with each locomotive. The lead controller may be further configured to determine a total electrical power output requirement for the consist and an electrical power output requirement for each locomotive in the consist based at least in part on the data from the power bus electrical characteristics sensor associated with each locomotive and the total electrical power output requirement for the consist. The lead controller may be further configured to supply instructions to dynamically adjust at least one of an output voltage or an output current generated by the generator associated with each locomotive to a desired voltage or current that may fall anywhere within the rated capacity of the generator.

In another aspect, the present disclosure is directed to a method of controlling a plurality of locomotives in a consist, the consist including a lead locomotive, a lead controller associated with the lead locomotive, at least one trailing locomotive, and at least one secondary controller associated with each of the at least one trailing locomotive, each locomotive including an engine, a generator, a traction motor, a power bus electrically connecting the generator to the traction motor, and a power bus electrical characteristics sensor for detecting at least one of voltage or current in the power bus. The method may include receiving data at the lead controller from the power bus electrical characteristics sensor associated with each locomotive, the data including information on at least one of a voltage or a current being output by the generator associated with each locomotive, determining by the lead controller a total electrical power output requirement for the consist, and determining by the lead controller an electrical power output requirement for each locomotive in the consist based at least in part on the data from the power bus electrical characteristics sensor associated with each locomotive and the total electrical power output requirement for the consist. The method may further include supplying instructions to dynamically adjust at least one of an output voltage or an output current generated by the generator associated with each locomotive to a desired voltage or current that may fall anywhere within the rated capacity of the generator.

DETAILED DESCRIPTION

Figure 1:
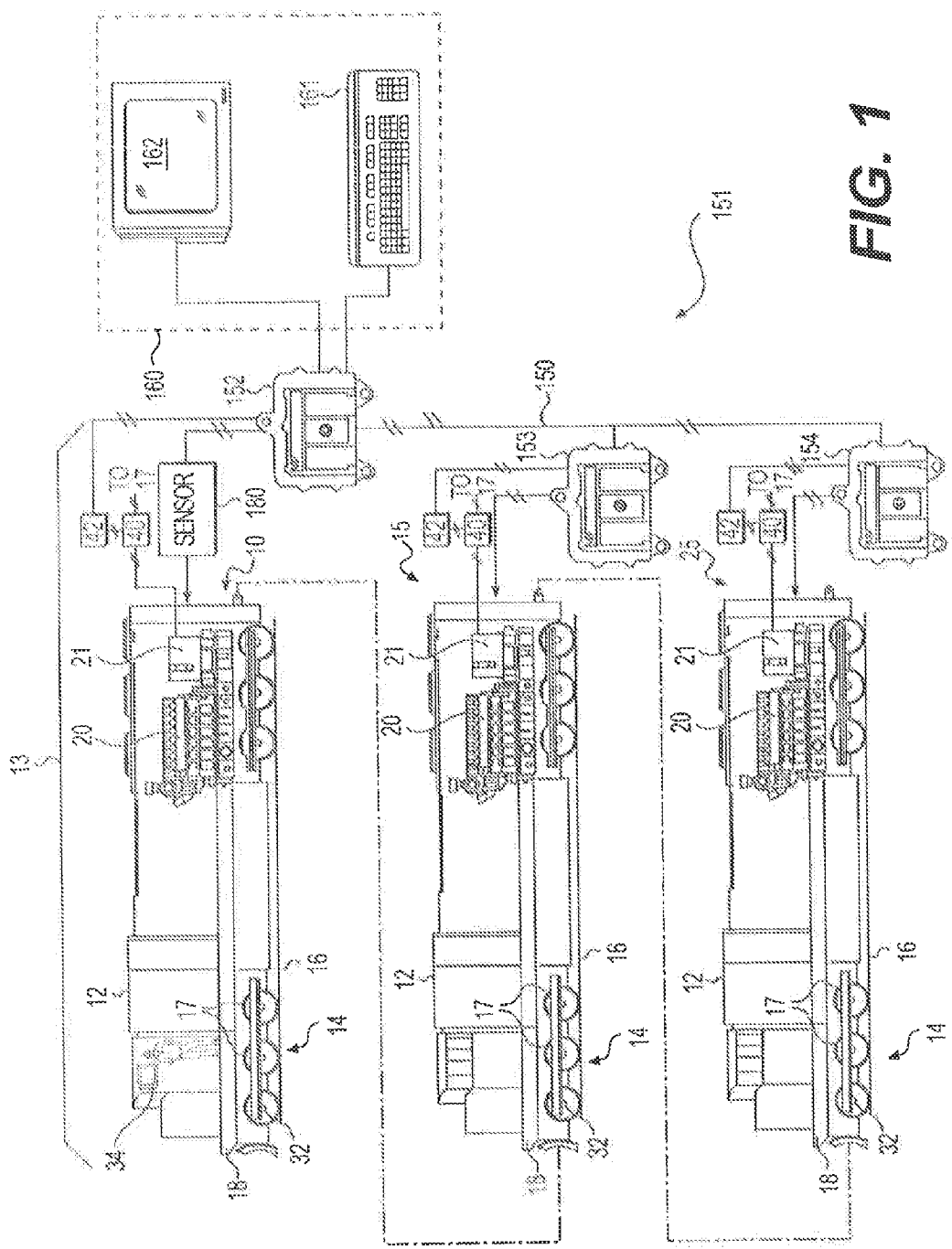
FIG. 1 is a diagrammatic illustration of a system for controlling multiple locomotives.

FIG. 1 illustrates an exemplary disclosed train consist 13 having a lead locomotive 10 and one or more trailing locomotives 15, 25 operatively coupled to lead locomotive 10. In some implementations, additional cars may be included within consist 13 and towed by lead locomotive 10 and trailing locomotives 15, 25, for example, a passenger car (not shown), a cargo container car (not shown), or another type of car. Although a particular order of cars in consist 13 is shown in FIG. 1 and described above, a different order may be implemented as desired. For example, trailing locomotive 15 could be situated in front of lead locomotive 10.

Lead locomotive 10 may include a car body 12 supported at opposing ends by a plurality of trucks 14 (e.g., two trucks 14). Each truck 14 may be configured to engage a track 16 via a plurality of wheels 17, and support a frame 18 of car body 12. Any number of engines 20 may be mounted to frame 18 and configured to drive a generator 21 to produce electricity that propels wheels 17 of lead locomotive 10. In the exemplary implementation shown in FIG. 1, lead locomotive 10 includes one engine 20 and one generator 21, although more than one engine and more than one generator may be included on each locomotive.

Engine 20 may be a large engine, for example an engine having sixteen cylinders and a rated power output of about 4,000 brake horsepower (bhp). Engine 20 may be configured to combust a gaseous fuel, such as natural gas, and generate a mechanical output that drives generator 21 to produce electrical power. The electrical power from generator 21 may be used to propel lead locomotive 10 via one or more traction motors 32 associated with wheels 17. It should be noted that engine 20 may have a different number of cylinders, a different rated power output, and/or be capable of combusting another type of fuel, if desired.

Generator 21 may be, for example, an alternating current (AC) induction generator, a permanent-magnet generator, an AC synchronous generator, or a switched-reluctance generator. In one implementation, generator 21 may include multiple pairings of poles (not shown), each pairing having three phases arranged on a circumference of a stator (not shown) to produce an alternating current with a frequency of about 50-60 Hz. Electrical power produced by generator 21 may be directed to traction motor 32 by way of one or more power buses, for example, power bus 40, and, in some implementations, a converter and/or inverter.

Traction motors 32 may be generally operable to receive AC power from generator 21 via a converter and the power buses, and to use the power to produce a mechanical output that drives wheels 17 via a differential and/or final drives. For example, traction motor 32 may embody an AC induction motor connected to receive three-phase AC power from a converter and generator 21 and generate an output having a rotational speed and torque in accordance with an operator desired speed and torque of wheels 17. Traction motors 32 may alternatively embody an AC synchronous motor or any other AC traction motor known in the art. It should be noted that traction motors 32 may additionally be operable to receive mechanical power from wheels 17 and use the mechanical power to generate variable-frequency, variable-voltage AC power in a dynamic braking mode, if desired. Traction motors 32 may alternatively embody DC traction motors such as, for example, switched reluctance traction motors or a DC motor/generator, if desired.

As traction motors 32 draw more or less electrical power from associated power buses, the voltage of the power buses may fall or rise proportionally. A lead controller 152 associated with lead locomotive 10 may include a generator control module and associated voltage or current sensors which together may be configured to affect an output of each generator 21 on each locomotive 10, 15, 25 in response to the change in electrical characteristics of the power buses associated with each traction motor 32. For example, as traction motors 32 draw more power from their associated power buses and the corresponding voltages of the buses begin to drop, lead controller 152 may be configured to receive signals from a power bus electrical characteristics sensor, for example, sensor 42, indicative of these changes in voltage or current, and transmit command signals to associated secondary controllers 153, 154 on trailing locomotives 15, 25. The command signals may cause an automatic voltage regulator (AVR) and exciter associated with generator 21 to adjust rotor field current in generator 21 to increase the terminal voltage output from generator 21 to the power buses and to traction motors 32. Similarly, as traction motors 32 draw less electrical power from the associated buses and the corresponding voltages of the buses begin to increase, lead controller 152 may be configured to receive signals from a power bus electrical characteristics sensor indicative of these changes in voltage, and transmit command signals to again cause adjustments to rotor field currents of generators 21 to reduce their electrical power output to the buses. Additional or alternative methods of adjusting generator output and/or electrical characteristics of the power buses may be implemented, as desired. One example of a method of adjusting generator output voltage may include engaging a different set of contactors or electrical relays that are included in the electrical connection between generator 21 and traction motors 32. Some combinations of contactors may put certain parts of the generator windings into a series configuration that may result in a higher terminal voltage. Other combinations of contactors or electrical relays may put certain parts of the generator windings in parallel, resulting in a lower terminal voltage.

Lead locomotive 10 may also include a cabin 34 supported by frame 18. Cabin 34 may be an onboard location from which an operator observes performance of lead locomotive 10 and consist 13, and provides instructions for controlling engine 20, generator 21, traction motors 32, brakes (not shown), and other components of consist 13. In the disclosed embodiment, cabin 34 is a substantially enclosed structure located at a leading end of lead locomotive 10.

For the purposes of this disclosure, trailing locomotives 15, 25 may be considered to be self-powered mobile train cars having the same general components as lead locomotive 10. For example, trailing locomotives 15, 25 in an exemplary implementation may include car bodies 12, trucks 14, wheels 17, frames 18, engines 20, generators 21, and traction motors 32. These components of trailing locomotives 15, 25 may be substantially identical to the corresponding components of lead locomotive 10 or, alternatively, may have a different configuration, as desired. For example, the engine 20 of trailing locomotives 15, 25 may have a reduced output as compared to the engine 20 of lead locomotive 10. Similarly, the traction motors 32 of trailing locomotives 15, 25 could have a greater or lesser torque, different electrical power requirements, and/or different speed capacity compared to the traction motors 32 of lead locomotive 10. Also, in contrast to lead locomotive 10, trailing locomotives 15, 25 may not be provided with a cabin 34, in some implementations.

In some implementations, trailing locomotive 25 may be substantially different from lead locomotive 10 and trailing locomotive 15. Trailing locomotive 25 may have a different manufacturer, model number, and/or manufacture date than lead locomotive 10 and trailing locomotive 15, which may hinder communication abilities. For example, trailing locomotive 25 may be a General Electric (GE) locomotive, while lead locomotive 10 and trailing locomotive 15 may be Electro-Motive Diesel (EMD) locomotives. Notwithstanding these differences, consist control system 151 of this disclosure may allow proper communication between lead locomotive 10, trailing locomotive 15, and trailing locomotive 25, via a communication link 150.

Lead locomotive 10 in FIG. 1 may include lead controller 152 configured to control the operation of lead locomotive 10 and the entire consist 13. Second locomotive 15, designated as a trailing locomotive in this implementation, may have secondary controller 153, and third locomotive 25, also designated as a trailing locomotive in this implementation, may have secondary controller 154. Each controller 152, 153, 154 may include at least an engine control, electrical power output control for an associated generator, electrical power control for an associated traction motor, and a locomotive control, and may additionally include an exhaust aftertreatment system (ATS) control if ATS hardware is included on the associated locomotive. Lead controller 152 on lead locomotive 10 may be communicatively coupled over communication link 150 to second trailing locomotive controller 153, and to third trailing locomotive controller 154. Each controller 152, 153, 154 may include one or more processors, or various combinations of software and hardware, or firmware configured to execute instructions, such as routines, programs, objects, components, or data structures that perform particular tasks or implement particular abstract data types.

The tasks performed by controllers 152, 153, 154 may also be performed by remote processing devices that are linked through a communications network. In a distributed computing environment, program modules may be located in both local and remote computer storage media including memory storage devices. These local and remote computing environments may be contained entirely within the locomotive, or adjacent locomotives in a consist, or off-board in wayside or dispatch centers where wireless communication may be used. This method and system may be applicable to communicating data between any of the linked locomotives 10, 15, 25. The terms "first", "second", and "third" locomotive or controller are used to identify respective locomotives or controllers in the consist and are not meant to characterize an order or position of the vehicles unless otherwise specified. It may be the case that the first and second locomotives are adjacent to and mechanically coupled with one another, or one or more locomotives may be connected together in one or more consists that are spaced apart with non-locomotive cars such as freight cars connected in between the locomotives. Lead locomotive 10 also may not be the first locomotive in a consist.

As shown in FIG. 1, controllers 152, 153, 154 may be interconnected by a communication link 150. Communication link 150 may be a standard 27 pin, multiple unit (MU) cable. Network or other data may be transmitted from one locomotive in the consist to another locomotive, such as from lead locomotive 10 to trailing locomotive 15 or trailing locomotive 25. Each locomotive 10, 15, 25 may be adjacent to and mechanically coupled with another locomotive in the consist 13 such that all locomotives in the consist are connected. "Network data" refers to data that is packaged in packet form, meaning a data packet that comprises a set of associated data bits. Each data packet may include a data field and a network address or other address uniquely associated with a computer unit or other electronic component in the consist 13. In one implementation, the network data may be transmitted over a conductive pathway that extends between the locomotives, such as a locomotive MU cable bus. Alternatively, the conductive pathway may include another cable or bus, such as an electronically controlled pneumatic brake train line. The MU cable bus may be an existing electrical bus interconnecting the lead locomotive 10 and the trailing locomotives 15, 25 in consist 13. The MU cable bus provided as communication link 150 may also be used in locomotive consist 13 for transferring non-network control information between locomotives in the consist. "Non-network" control information refers to data or other information, used in the locomotive consist for control purposes, which is not packet data. In alternative implementations, non-network control information may be low bandwidth or very low bandwidth data.

In another implementation, the network data may be converted into modulated network data by lead controller 152 for transmission over communication link 150. The modulated network data may be orthogonal to the non-network control information transferred between locomotives over communication link 150, to avoid interference. At recipient/subsequent locomotives, the modulated network data may be received over communication link 150 and de-modulated for use by a locomotive electronic component. For these functions, consist control system 151 may include respective router transceiver units positioned in lead locomotive 10 and each of trailing locomotives 15, 25 in locomotive consist 13.

Communication link 150 may be an existing electrical bus interconnecting lead locomotive 10 and trailing locomotives 15, 25 in consist 13. Communication link 150 may be used in locomotive consist 13 for transferring non-network control information between locomotives in consist 13. In another aspect, non-network control information may be low bandwidth or very low bandwidth. The non-network control information may be transmitted over communication link 150 according to a designated voltage carrier signal (e.g., a 74 volt on/off signal, wherein 0 volt represents a digital "0" value and +74 volts a digital "1" value, or an analog signal 0 to 74 volts, wherein the 0 to 74 volt voltage level may represent a specific level or percentage of functionality). The non-network control information may be transmitted and received using one or more electronic components in each locomotive that are configured for this purpose. Older, "legacy" locomotives may only be equipped to handle this low bandwidth, non-network control information.

As discussed above, the communication system 10 may comprise respective router transceiver units positioned in lead locomotive 10 and each of trailing locomotives 15, 25 in locomotive consist 13. The router transceiver units may each be electrically coupled to communication link 150. The router transceiver units may be part of controllers 152, 153, 154, and may be configured to transmit and/or receive network data over communication link 150. In one implementation, each router transceiver unit may receive network data from a computer unit or other electronic component in locomotive consist 13, and modulate the received network data into modulated network data for transmission over communication link 150. Similarly, each router transceiver unit may receive modulated network data over communication link 150 and de-modulate the received modulated network data into network data 16. "Modulated" means converted from one form to a second, different form suitable for transmission over communication link 150. "De-modulated" means converted from the second form back into the first form. The modulated network data may be orthogonal to the non-network control information transferred between locomotives over communication link 150. "Orthogonal" means that the modulated network data does not interfere with the non-network control information, and that the non-network control information does not interfere with the modulated network data (at least not to the extent that would corrupt the data). At recipient/subsequent locomotives, the modulated network data may be received over communication link 150 and de-modulated back into the network data for use by a locomotive electronic component.

Lead controller 152 may be configured to process and transmit precise operating commands to trailing locomotive secondary controllers 153, 154. The operating commands from lead controller 152 may include modulated high bandwidth, high data rate signals capable of carrying a wide range of specific types of analog and/or digital data commands spanning a wide frequency range, such as dynamically variable and infinitely adjustable or nearly infinitely adjustable electrical power requirements. These electrical power requirements may be specified in SI (International System of Units) units of watts or kilowatts, or otherwise specified in terms of continuously and infinitely adjustable or nearly infinitely adjustable levels of voltage and/or current output by generators 21 and present in the power buses connecting generators 21 to traction motors 32. Examples of these operating commands from lead controller 152 may include the signals referred to above that may be generated by a generator control module in lead controller 152 to affect an electrical power output of a generator 21 on one of locomotives 10, 15, 25 in response to a change in characteristics of the power bus associated with a traction motor 32. In various implementations, the terminal voltage output by generator 21 may be changed to a potentially infinite number of different values over the entire range of rated output voltages for that generator by gradually and/or continuously engaging a different set of contactors or electrical relays that hook generator 21 to traction motors 32. Although these implementations are referred to as having "infinitely adjustable" output values, one of ordinary skill in the art will recognize that the number of potential output values may not be truly infinite, but may be significantly greater and more continuously adjustable than is the case with traditional eight discrete throttle notch settings. Some combinations of contactors may put certain parts of the generator winding into a series configuration that results in a higher voltage. Other combinations of contactors may put certain parts of the generator winding in parallel, resulting in a lower voltage. Traction motors 32 may produce more power at higher voltages. Whereas a traditional change in throttle notch setting may result in the engagement of a different combination of contactors to produce a different voltage, there are typically only eight discrete throttle notch settings and an idle position. The ability to transmit high bandwidth operating commands may also allow for commands that designate infinitely adjustable or nearly infinitely adjustable electrical power output requirements over the entire power output rating for a generator. Additional examples of infinitely adjustable or nearly infinitely adjustable electrical power requirements may include dynamically adjustable amounts of electrical power consumed by one or more traction motors. Again, the reference to "infinitely adjustable" electrical power outputs or amounts of electrical power consumed will be recognized by one of ordinary skill in the art to encompass continuous variations in electrical power that go significantly beyond what is possible with traditional discrete throttle notch settings. In certain implementations, "high bandwidth" data may be data transmitted at average rates of 10 Mbits/sec. or greater. The ability of lead controller 152 to process and transmit modulated, high bandwidth data allows for a high information density communication environment.

Implementation of high data rate communication between locomotives over communication link 150 may allow lead controller 152 to take advantage of additional information that lead locomotive 10 can collect from each of trailing locomotives 15, 25. Moreover, instead of transmitting only simple Boolean logic commands such as discrete notch settings for controlling the trailing locomotives, lead controller 152 may be configured to transmit desired generator electrical power output anywhere over the entire operational power range for each generator 21 on each trailing locomotive 15, 25. Lead controller 152 may further enable transmission of these modulated high bandwidth and/or high data rate commands over a traditional 27 pin MU cable, thereby providing for the communication of much more information and data over a trainline than a traditional 74 volt signal used to communicate discrete, preselected throttle notch settings or other simple Boolean logic commands.

Lead controller 152 may be configured to receive information from each of trailing locomotives 15, 25 including identification of the type of locomotive, age of the locomotive, wear characteristics, current operating parameters, and whether each trailing locomotive is capable of receiving and processing signals such as the modulated high bandwidth signals that may carry dynamically variable and infinitely adjustable electrical power commands. A trailing locomotive that is equipped to receive and process these types of modulated high bandwidth signals may be configured to operate in accordance with requirements for generator electrical power output, traction motor electrical power consumption, and/or traction motor tractive power output that encompass all levels of power output in between traditional discrete throttle notch settings. "Infinitely adjustable" electrical power commands refers to the ability to precisely and continuously adjust electrical power output or electrical power consumption as measured in SI units of watts or kilowatts, or voltage or current outputs as measured in volts or amps in the power buses connecting generators 21 and traction motors 32 at any level across the complete range of electrical power capabilities of the associated electrical power devices. This ability to provide infinitely adjustable or nearly infinitely adjustable electrical power commands may allow for a more granular control of total power output by a consist, or total fuel efficiency of the consist than is possible when power output can only be controlled to eight discrete throttle notch settings. The ability to provide commands that may operate generators 21 at any electrical power level over their entire rated power ranges, or to precisely control the amount of electrical power provided to traction motors 32, may also enable lead controller 152 to provide a more granular control of the desired tractive effort produced by each locomotive. This ability to provide a more granular control of the electrical power output by each locomotive may also enable further improvement of parameters such as fuel efficiency, exhaust emissions, life expectancy, and load levels for the entire consist. For example, a consist of locomotives that are only capable of being controlled to eight discrete throttle notch settings may not allow for adjustments to the electrical power output levels of individual locomotives in between the traditional eight throttle notch settings that may achieve further improved fuel efficiency for the consist while at the same time meeting other goals such as load distribution and conservation of fuel in particular locomotives that may be running low on fuel.

Lead controller 152 may be further configured to receive other information or data relevant to the instantaneous operating performance of each trailing locomotive, such as current fuel levels at each trailing locomotive, ambient conditions at each locomotive, wear levels of various components on each locomotive, and track conditions being experienced by each particular locomotive. Lead controller 152 may be still further configured to include a leader system that may provide information on upcoming conditions such as track conditions and grade over the next 50 miles. Such a leader system may acquire data from GPS receivers and/or maps of the upcoming areas, and provide additional information to lead controller 152 that may be used in determining specific power commands to be sent to each of locomotives 10, 15, 25.

Communication link 150 may be any wired or wireless link or links between controllers 152, 153, 154 such as a 27 pin multi-unit (MU) cable, which is a known method for providing a hard-wired communication link among the locomotives of a consist. For example, if controllers 152, 153, 154 include microprocessors, communication link 150 may be part of a network bus such as an Ethernet twisted pair cable linking the microprocessors. Alternatively, each of controllers 152, 153, 154 may be associated with a transceiver that transmits and receives wireless signals in communication with each other. Controllers 152, 153, 154 may also provide operator controls for use by one or more operators to indicate a desired operating condition. Lead controller 152 may be configured to process, modulate, and/or condition signals compatible with high bandwidth and/or high data rate communication of analog and/or digital information over the traditional 27 pin MU cable. Various other known circuits may be associated with lead controller 152, including power supply circuitry, signal-conditioning circuitry, solenoid driver circuitry, communication circuitry, and other appropriate circuitry.

Controllers 152, 153, 154 may be configured to control the engines or prime movers of each locomotive 10, 15, 25, and other operating parameters based on input from a vehicle operator via an input device 161, as well as input received from various sensors 180. Information may be received from a plurality of engine sensors, fuel level sensors, electrical power output sensors, voltage sensors, current sensors, and/or exhaust aftertreatment (ATS) sensors, and each controller 152, 153, 154 may be configured to send control signals to a plurality of engine actuators, electrical power actuators or controls such as automatic voltage regulators associated with generators 21, traction motor controllers, and/or ATS actuators on each locomotive 10, 15, 25. As one example, engine sensors and/or ATS sensors may include exhaust gas sensors located in, or coupled with one or more exhaust manifolds for each of one or more engines provided with each locomotive, exhaust temperature sensors located upstream and/or downstream of various emission control devices, and intake regulated emissions level sensors. Various other sensors such as particulate sensors for a diesel particulate filter (DPF), additional pressure, temperature, flow, air/fuel ratio, and alternate regulated emissions sensors may be coupled to various locations on or in the one or more engines provided with each locomotive 10, 15, 25. As another example, engine actuators and/or ATS actuators may include fuel injectors, hydrocarbon (HC) dosing injectors, reductant injectors used in conjunction with a selective catalytic reduction (SCR) process to reduce NOx levels, and throttle or notch controls. Other actuators for controlling mechanical and electrical components or flows, such as a variety of additional valves, voltage regulators, contactor or electrical relay actuators, and current regulators may be coupled to various locations in each of one or more engines, generators, power buses, and traction motors associated with each of locomotives 10, 15, 25.

Lead controller 152 may be further configured to store data and information about trailing locomotives 15, 25 in a memory device to assist communication with controllers 153, 154 located onboard trailing locomotives 15, 25, respectively. Lead controller 152 may also be configured to use this data and information to selectively override system functions and modes of operation of trailing locomotives 15, 25 based on the information about trailing locomotives 15, 25 stored within lead controller 152. Lead controller 152 may store data and information on the electrical power output characteristics of generators 21, and electrical power consumption characteristics of traction motors 32, and maintain this information in continually updated logs of the performance characteristics of the various electric drive components on each locomotive.

Input device 160 may be located onboard lead locomotive 10 and may include any component or components configured to transmit signals to one or more components of consist 13. In some implementations, input device 160 may include components that an operator can manipulate to indicate whether the operator desires propulsion of consist 13 by traction motors 32 and, if so, in what direction and with how much power the operator desires traction motors 32 to propel consist 13. For example, input device 160 may include an operator input device 161 with which an operator may indicate a desired consist performance to be received by lead controller 152. In an alternative implementation, input device 160 may be a computer-based system that may allow consist 13 to operate automatically without requiring an operator. Lead controller 152 may include circuitry and/or algorithms that enable lead controller 152 to receive and process information in real time from all locomotives 10, 15, 25, operator input, sensors, databases, look-up tables, and/or maps. Lead controller 152 may also be configured to determine from this information exactly what dynamically and infinitely adjustable electrical power output should be requested from each of generators 21 on each of locomotives 10, 15, 25 in consist 13 to optimize fuel efficiency for the entire consist 13, reduce emissions, re-allocate load requirements, or otherwise vary the electrical power outputs of each locomotive as a function of operating parameters, constraints, and objectives.

Operator input device 161 may be a keyboard, touchpad, throttle, or other suitable mechanism for receiving operator input. The operator may use operator input device 161 to manually adjust various parameters of consist 13. Operator input device 161 may transmit a signal to lead controller 152 indicating the desired consist performance of consist 13. Lead controller 152 may be configured to communicate the desired consist performance through communication link 150 to secondary controllers 153, 154. Additionally, input device 160 may include a display 162 in communication with lead controller 152. Display 162 may be any known display mechanism and may visually output information useful to an operator of consist 13. As one example, display 162 may output information on the electrical power in watts being output by each generator 21 at any particular time, the voltage being measured at any power bus connecting generators 21 to traction motors 32, and/or the tractive power being produced by each traction motor 32.

To facilitate effective control of the supply of electricity from generator 21 to traction motors 32 on each locomotive 10, 15, 25 in consist 13, lead controller 152 and trailing locomotive secondary controllers 153, 154 may monitor various aspects of engine operation, generator operation, traction motor operation, and/or transmission of electricity within the system. For example, lead controller 152 and trailing locomotive secondary controllers 153, 154 may monitor engine speed, engine fueling, and/or engine load for their respective engines 20. Likewise, lead controller 152 and secondary controllers 153, 154 may monitor the voltage, current, frequency, and/or phase of electricity generated by their respective generators 21 and transmitted over power buses connecting generators 21 to traction motors 32. Additionally, lead controller 152 and secondary controllers 153, 154 may monitor the electricity supplied to and/or consumed by traction motors 32, a torque output of traction motors 32, and/or tractive forces of locomotives 10, 15, 25. Lead controller 152 and secondary controllers 153, 154 may also employ sensors and/or other suitable mechanisms to monitor the operating parameters. For example, lead controller 152 may monitor an actual performance of consist 13 with one or more sensor(s) 180, where the actual performance of consist 13 may include total electrical power consumed by all traction motors 32 during a particular time period or travel distance.

Lead controller 152 may receive input data from operator input, stored data, look-up tables, maps, algorithms, a remote dispatch center, wayside devices, and/or the various engine, electrical power, ATS, or locomotive sensors. Lead controller 152 may be configured to include program code that processes the input data, and triggers various engine actuators, voltage output configurations for electrical power generating devices such as generators 21, voltage supply to traction motors 32, ATS actuators, and/or locomotive actuators. Lead controller 152 may be further configured to send instructions over communication link 150 to secondary controllers 153, 154 at each trailing locomotive 15, 25. Lead controller 152 may be configured in particular to process instructions for infinitely adjustable or nearly infinitely adjustable electrical power output requirements for each generator 21 in a consist in such a way that overall results such as fuel efficiency for the entire consist are optimized or improved. In one non-limiting example, lead controller 152 may be further configured to receive information representative of upcoming track conditions, track grades, or other track characteristics or environmental conditions over the next 50 miles. Based on this information, lead controller 152 may be configured to determine whether upcoming conditions will allow the consist to pull the train at desired speeds with fewer than all of the locomotives.

In situations where fewer than all of the locomotives in consist 13 are required to meet desired performance characteristics, lead controller 152 may be configured to automatically improve fuel efficiency for consist 13 by transmitting a command to secondary controllers on one or more of the trailing locomotives, instructing the one or more trailing locomotives to virtually isolate itself or themselves. In an "isolation" mode, a trailing locomotive may essentially take itself electrically offline as a result of the command received from lead controller 152. In isolation mode a trailing locomotive may no longer respond to throttle or power commands from lead controller 152, and may instead receive start-up and shut-down commands from an Automatic Engine Start-Stop (AESS) system on the trailing locomotive. In various non-limiting implementations, the AESS system may monitor conditions on the trailing locomotive such as the electrical charge in batteries, air pressure in brake line reservoirs, and engine temperatures. Based on these monitored local conditions, the AESS system may start-up and shut-down the trailing locomotive completely independently from any command received from lead controller 152, as independently determined by the AESS system to maintain desired local conditions on the isolated locomotive.

Lead controller 152 may be configured to receive information from a plurality of engine sensors, electrical sensors, ATS sensors, and/or locomotive sensors, and may be configured to send control signals to a plurality of engine actuators, generator controls, traction motor controls, ATS actuators, and/or locomotive actuators. Example locomotive sensors may include locomotive position sensors (such as GPS devices), environmental condition sensors (which may sense altitude, ambient humidity, temperature, barometric pressure, and/or ambient levels of various pollutants), locomotive coupler force sensors, track grade sensors, locomotive notch sensors (also referred to as throttle sensors), and brake position sensors. Various other sensors may be coupled to various locations in the locomotive. Example locomotive actuators may include a locomotive throttle notch actuator, air brakes, and brake air compressor.

Lead controller 152 may provide detailed control information in the form of modulated, high bandwidth signals transmitted over communication link 150. In various implementations, these signals may dynamically specify the electrical power output required at any given moment from each generator 21 on each locomotive 10, 15, 25 to meet the instantaneous power needs of consist 13 in the most fuel efficient manner possible. Alternatively or in addition, lead controller 152 may process and transmit signals indicative of the electrical power to be consumed by each of traction motors 32, the torque output of each of traction motors 32, and/or the tractive forces produced by each of locomotives 10, 15, 25. Other actuators may be coupled to various locations in each locomotive 102, 104, 106.

Lead controller 152 may be further configured to receive inputs from the various engine sensors, electrical sensors, ATS sensors, and locomotive sensors, process the data, and trigger the engine actuators, generator electrical power control actuators, traction motor actuators, ATS actuators, and locomotive actuators in response to the processed input data. Lead controller 152 may be configured to take these actions based on instructions, look-up tables, one or more maps, or programmed code or algorithms corresponding to one or more routines. For example, lead controller 152 may be configured to determine a locomotive trip plan including locomotive power outputs and brake settings, engine operating parameters, and the precise levels of electrical power output expected from each generator on each locomotive based on the locomotive operating conditions and current environmental conditions for each locomotive 10, 15, 25. Lead controller 152 may be configured to receive engine data, generator output voltage data, and/or ATS data (as determined by the various engine sensors, power bus electrical characteristics sensors, and/or ATS sensors). Lead controller 152 may be further configured to process the generator electrical power output data, engine data, and/or ATS data, and transfer or download instructions or code for triggering the generator control actuators, engine actuators, and/or ATS actuators based on routines or algorithms performed by one or more processors associated with lead controller 152.

In one example, lead controller 152 may be configured to determine a trip plan including precise electrical power output requirements for each locomotive 10, 15, 25 based on individual engine operating conditions, generator electrical power output capabilities, traction motor electrical power requirements, age of the equipment, and operator preferences. Individual locomotives and/or one or more consists of locomotives in a train may be operated in accordance with particular power duty cycles that specify the time spent at each power level or range of total power outputs as a fraction of total time of operation. In various implementations, for example where engines 20 are most efficient and achieve best possible brake specific fuel consumption at or near full power, lead controller 152 may provide commands for electrical power output from the generators on each locomotive that will result in the engines on each locomotive operating close to full power for as much time as possible. Based on possible differences between the trip plan's time in a particular power duty cycle and a reference duty cycle (such as an EPA duty cycle), lead controller 152 may reconfigure the trip plan. For example, based on the differences, lead controller 152 may be configured to readjust parameters set during trip planning. These parameters may include electrical power output requirements for each generator 21, electrical power consumption or draw by each traction motor 32, fuel injection settings for each engine 20, ignition timing, and other engine operating parameters and exhaust aftertreatment parameters. In one example, as an actual duty cycle for one or more of locomotives 10, 15, 25 starts deviating from a reference duty cycle, thereby possibly leading to increased exhaust emissions or reduced fuel efficiency, lead controller 152 may provide instructions to readjust electrical power output requirements for one or more locomotives 10, 15, 25 for a trip plan that imposes fuel economy and exhaust emissions as constraints. Lead controller 152 may be configured to customize a trip plan, and modify the trip plan during a particular trip for a train based on network data and/or non-network data received from one or more of an operator, remote dispatch center, onboard sensors including engine operating sensors, electrical sensors, and locomotive sensors, and wayside sensors including hot box detectors, impact detectors, and hot wheel detectors.

In various alternative implementations, operator input may include a total wattage power output goal, a fuel efficiency goal, an emissions level goal, a tractive power goal, or a performance goal for each of the locomotives or for the consist as a whole. Lead controller 152 may be configured to determine the electrical power output desired from each of locomotives 10, 15, 25 at any particular time, or over any particular period of time, possibly including virtually isolating one or more locomotives in certain situations, in order to improve fuel efficiency for the entire consist 13, reduce emissions, re-allocate load requirements, or otherwise vary the power outputs of each locomotive as a function of operating parameters, constraints, and objectives. This determination may be made by calculating from one or more algorithms, or by reference to a look-up table, one or more maps, or other data obtained over a network or stored in memory.

Operation of the disclosed system will be described in the following section in connection with FIGS. 2 and 3. Methods according to various exemplary implementations will be discussed in more detail in the following section to further illustrate the disclosed concepts.

INDUSTRIAL APPLICABILITY

The disclosed locomotive control system may be applicable to any locomotive control system where a lead locomotive controller determines dynamically variable and infinitely adjustable or nearly infinitely adjustable electrical power output levels required from the generators on each of the locomotives in a consist to meet performance requirements or goals, while improving fuel efficiency or other operating parameters for the entire consist. The disclosed locomotive control system may be utilized with any number of vehicles and/or different types of vehicles having electrical power drive in various arrangements. For example, consist 13 could include additional locomotives, passenger cars, freight cars, tanker cars, or other rail or non-rail vehicles having electrical power drive.

The more locomotives that consist 13 includes, the more important it may be that data, control commands, and power are effectively relayed and maintained along consist 13. Also, it may be desirable to achieve higher communication abilities and more granular control of the actual electrical power outputs of generators and/or electrical power consumption by traction motors to obtain higher fuel efficiencies for the consist as a whole. The disclosed consist control system 151 may include components and methods for accurately achieving a desired performance of consist 13. The operation of consist control system 151 will now be described with reference to FIGS. 2 and 3.

Figure 2:
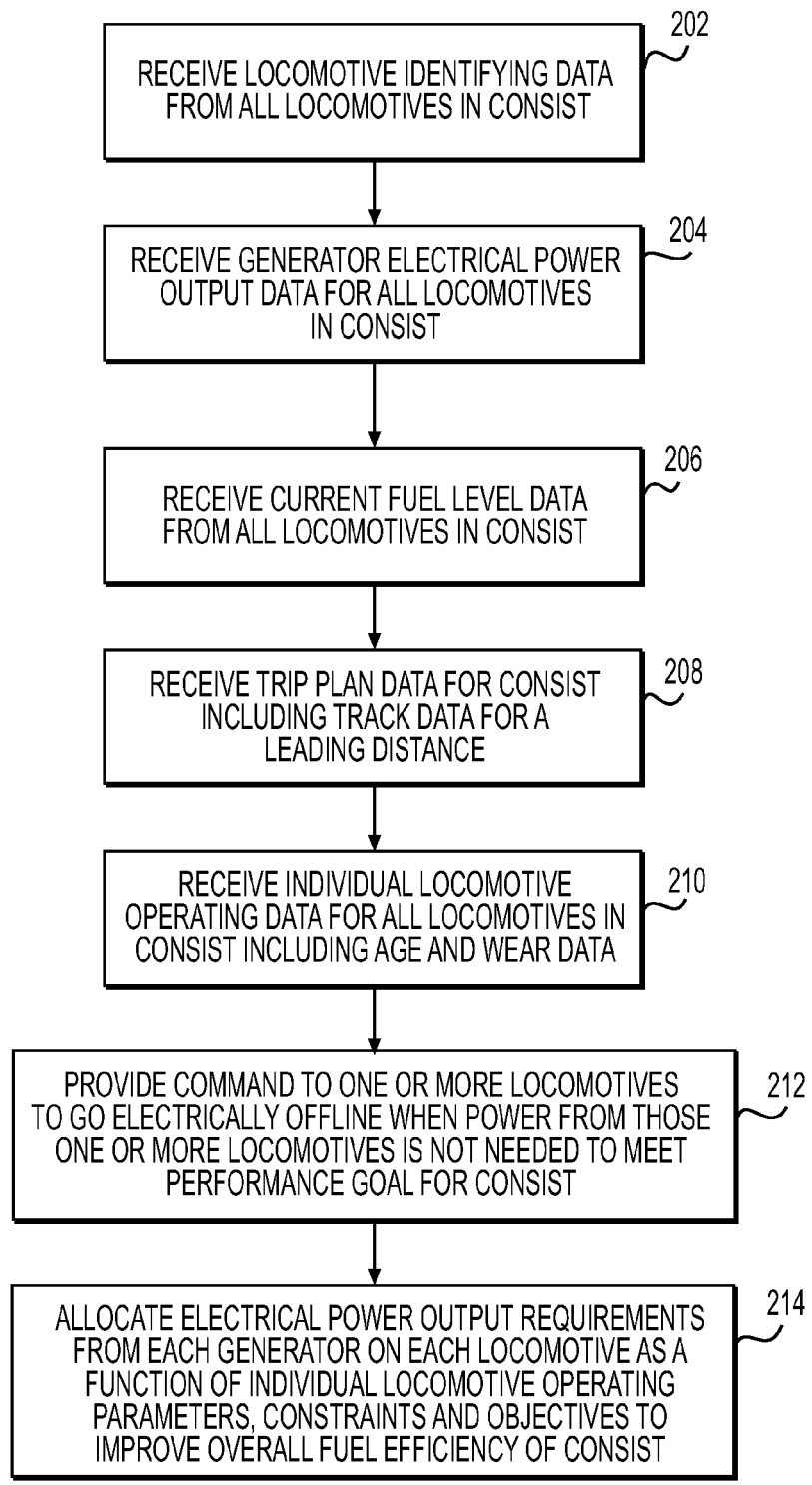
FIG. 2 is a flow chart depicting an exemplary disclosed method that may be performed by the system of FIG. 1.

At step 202 in FIG. 2, lead controller 152 may receive locomotive identifying data from all locomotives in consist 13. This identifying information may be used by lead controller 152 in determining whether a particular trailing locomotive is equipped to receive high bandwidth data such as commands providing infinitely adjustable electrical power output requirements for the generator on the locomotive. Legacy locomotives may not be equipped to handle such high bandwidth data, and so may only receive low bandwidth commands from lead controller 152 over communication link 150, such as traditional discrete throttle notch settings.

At step 204, lead controller 152 may receive generator electrical power output data for all locomotives in the consist. This data may include wattages, voltages, currents, frequencies, phase, or other data relevant to the electrical power being produced by each generator 21 at any particular time. High bandwidth power output data in the form of actual wattage being output by all of the generators on a consist at any particular time, or exact voltage levels present in the power buses connecting generators 21 to traction motors 32 may provide lead controller 152 with a much more precise measure of constantly changing power demands on the consist than would be possible with traditional throttle notch settings.

At step 206, lead controller 152 may receive the current fuel level data from all locomotives in the consist. This data may be used by lead controller 152 to determine whether the electrical power output requirements for each locomotive should be redistributed in order to conserve fuel in a locomotive that is at a fuel level below a threshold.

At step 208, lead controller 152 may receive trip plan data for the consist that may include upcoming track data over a leading distance. A leader system providing this type of upcoming track data may include data sources such as GPS receivers, maps, or other stored data for the particular area or terrain that is being traversed. The data that may be relevant to trip planning could include track inclines and declines over the next portion of the trip, track curvature, upcoming tunnels or bridges, switching stations, road crossings, weather conditions, areas such as residential areas requiring lower emission levels, or other factors that may be relevant in the determination of power distribution to improve overall fuel efficiency of the consist.

At step 210, lead controller 152 may receive individual locomotive operating data for all of the locomotives in the consist including the ages of each locomotive, and their relative condition, including wear characteristics on various components. In certain implementations, this data may be used by lead controller 152 in determining the electrical power output requirements that should be imposed on each locomotive when weighing the goal of improving overall fuel efficiency for the consist against the goal of increasing longevity of the equipment or reducing the number of potential breakdowns or maintenance intervals.

At step 212, lead controller 152 may provide a command to one or more locomotives to go electrically offline when power from those locomotives is not needed to meet performance goals for the consist. As part of the data received from the leader system referenced above at step 208, lead controller 152 may determine that power requirements over the next 50 miles due to track grade may allow for one or more of the trailing locomotives to go electrically offline for improved overall fuel efficiency for the consist. A command may be issued to a locomotive to virtually isolate itself by no longer responding to power commands from lead controller 152. In an isolated condition, a trailing locomotive may only receive commands to start or stop the engine from an AESS system on the trailing locomotive itself. The AESS system may monitor conditions on the trailing locomotive such as the electrical charge in batteries, air pressure in brake line reservoirs, and engine temperatures. Based on these monitored local conditions, the AESS system may start-up and shut-down the trailing locomotive completely independently from any command received from lead controller 152, as necessary to maintain desired local conditions and operational readiness on the isolated locomotive.

At step 214, lead controller 152 may allocate electrical power output requirements from each generator on each locomotive as a function of individual locomotive operating parameters, constraints and objectives to improve the overall fuel efficiency of the consist. Lead controller 152 may communicate and coordinate with secondary controllers 153, 154 and other components of consist 13. Sensors located along consist 13 may alert lead controller 152 and/or the consist operator of changes to various physical phenomena at any point along consist 13. Such changes may include changes to speeds, electrical power outputs, voltages and/or currents in power buses, temperatures, displacements and/or pressures. Data communication along consist 13 may be accomplished via communication link 150.

Figure 3:
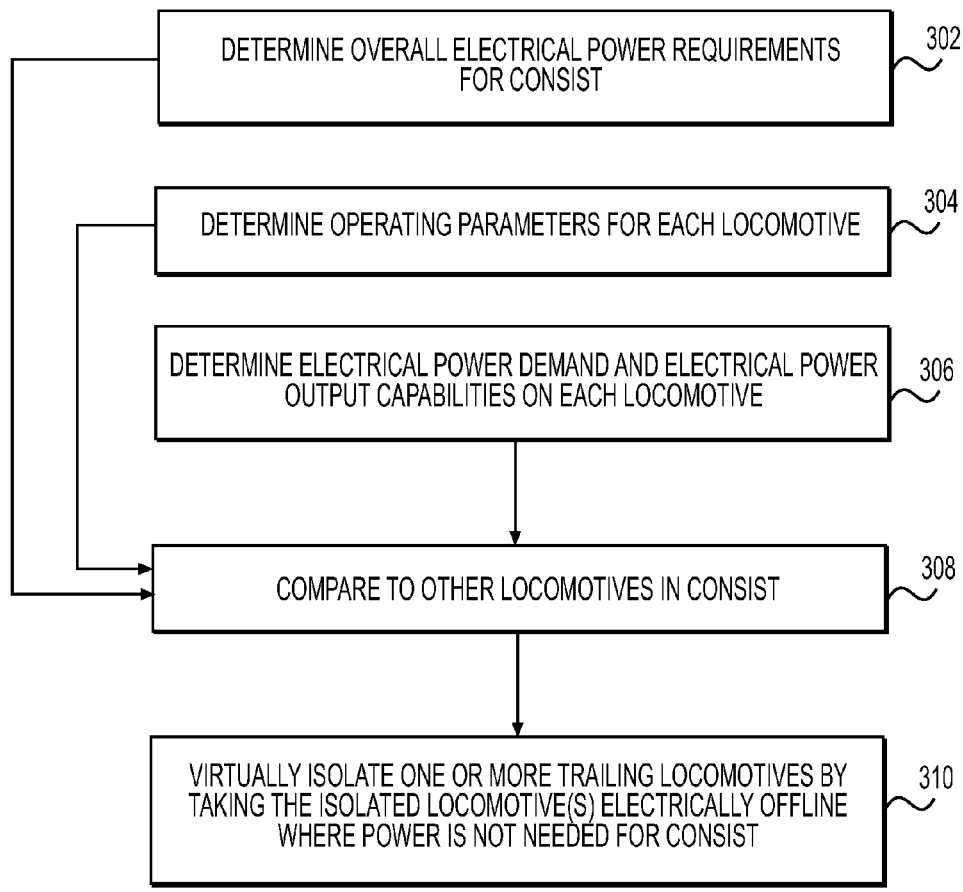
FIG. 3 is another flow chart depicting an exemplary disclosed method that may be performed by the system of FIG. 1.

FIG. 3 illustrates a flowchart for a control process according to another exemplary implementation. At Step 302, lead controller 152 may determine overall electrical power requirements for consist 13. Overall electrical power requirements for consist 13 may be determined based on one or more of a number of continuously or intermittently changing variables as well as parameters or constraints for the consist established by an operator, a trip plan, performance requirements for the consist, stored data, data retrieved from maps or look-up tables, data calculated from an algorithm, and other sources. Continuously or intermittently changing variables may include the loads that are being pulled by the consist, track conditions being experienced by each locomotive, condition of various components on the locomotives in the consist, ambient conditions, fuel levels for each locomotive, electrical power output levels for each generator, and other factors. Other data retrieved from look-up tables or other sources may include electrical power ratings for each generator 21, power/speed curves for each generator 21, torque/speed curves for each traction motor 32, and the capabilities of secondary controllers 153, 154 in trailing locomotives 15, 25 for receiving and processing high bandwidth data. In some implementations, the overall electrical power requirements for consist 13 may also factor in the goal of operating engines 20 on each locomotive 10, 15, 25 as close to full power for as much time as possible in any particular duty cycle if engines 20 are at maximum efficiency when operating at full power.

At step 304, the operating parameters for each of locomotives 10, 15, 25 in consist 13 may be retrieved. These operating parameters may include engine operating parameters for engines 20 on each locomotive, electrical power output capabilities of generator 21, electrical power consumption by traction motors 32, and tractive power or torque output by traction motors 32 at various speeds.

At step 306, lead controller 152 may determine the electrical power demands and electrical power output capabilities for each locomotive at any particular time or over selected time intervals. The results and data obtained from performing steps 302, 304, and 306 may then be compared at step 308. The results of the comparison performed at step 308 may then allow lead controller 152 to determine whether one or more locomotives may be virtually isolated at step 310. A decision to isolate a locomotive at step 310 by taking that locomotive electrically offline may be made for various reasons that may include improving overall fuel efficiency for the consist, conserving fuel on the isolated locomotive, increasing longevity of the isolated locomotive, reducing overall emissions, or other reasons. The ability of lead controller 152 to receive and transmit high bandwidth data over communication link 150 may enable more granular control of electrical power output from each locomotive, and may thereby also increase the ability to virtually isolate one or more trailing locomotives more frequently if desired, or for longer periods of time. The electrical power output expectations for each of locomotives 10, 15, 25 may be adjusted based on variations in engine capacities, generator capacities, traction motor capacities, and existing locomotive control systems. The electrical power output expectations may also be adjusted based on current traveling conditions. For instance, the electrical power output requirements for generators 21 may be adjusted differently when consist 13 is traveling uphill versus downhill, or when the specific locomotive on which a generator 21 is located is traveling uphill versus downhill. Additionally, the power level settings may be adjusted differently in order to obtain a desired fuel efficiency from locomotives 10, 15, 25. For example, loads may be shared disproportionately to improve efficiencies of individual engines having different capacities. Lead controller 152 may be programmed to include control strategies pertaining to these situations and any other situations that may affect operation and control of consist 13.

It will be apparent to those skilled in the art that various modifications and variations can be made to the disclosed consist control system. Other implementation will be apparent to those skilled in the art from consideration of the specification and practice of the disclosed methods. It is intended that the specification and examples be considered as exemplary only, with a true scope being indicated by the following claims and their equivalents.

What is claimed is:

1. A locomotive consist, comprising:
a lead locomotive;
at least one trailing locomotive;
each of the lead locomotive and the at least one trailing locomotive including an engine, a generator, a traction motor, a power bus electrically connecting the generator to the traction motor, and a power bus electrical characteristics sensor for detecting at least one of voltage or current in the power bus;
a lead controller associated with the lead locomotive of the consist;
at least one secondary controller associated with each of the at least one trailing locomotive and communicatively coupled by a communication link with the lead controller;
the lead controller configured to:
receive data from the power bus electrical characteristics sensor associated with each locomotive, the data including information on at least one of a voltage or a current being output by the generator associated with each locomotive;
determine a total electrical power output requirement for the consist;
determine an electrical power output requirement for each locomotive in the consist based at least in part on an operating condition of each locomotive in the consist and the data from the power bus electrical characteristics sensor associated with each locomotive and the total electrical power output requirement for the consist;

compare the electrical power output requirement for each locomotive in the consist to the electrical power output requirement for other locomotives in the consist; and supply instructions in the form of high bandwidth signals indicative of adjustments to rotor field currents of at least one of the generators associated with a locomotive to change electrical power output from the at least one generator to the power bus electrically connecting the at least one generator to the traction motor associated with the locomotive to a desired electrical power output that may fall anywhere within a rated capacity of the at least one generator based on the comparison.

2. A locomotive consist control system for a locomotive consist including a lead locomotive and at least one trailing locomotive, each locomotive including an engine, a generator, a traction motor, a power bus electrically connecting the generator to the traction motor, and a power bus electrical characteristics sensor for detecting at least one of voltage or current in the power bus, the locomotive consist control system comprising:

a lead controller associated with the lead locomotive of the consist;

a secondary controller associated with each of the at least one trailing locomotive of the consist and communicatively coupled by a communication link with the lead controller;

the lead controller configured to:

receive data from the power bus electrical characteristics sensor associated with each locomotive, the data including information on at least one of a voltage or a current being output by the generator associated with each locomotive;

determine a total electrical power output requirement for the consist;

determine an electrical power output requirement for each locomotive in the consist based at least in part on an operating condition of each locomotive in the consist and the data from the power bus electrical characteristics sensor associated with each locomotive and the total electrical power output requirement for the consist;

compare the electrical power output requirement for each locomotive in the consist to the electrical power output requirement for other locomotives in the consist; and supply instructions to dynamically adjust at least one of an output voltage or a current generated by the generator associated with each locomotive to a desired voltage or current that may fall anywhere within a rated capacity of the generator based on the comparison.

3. The locomotive consist control system of claim 1, wherein the lead controller is configured to supply instructions to dynamically adjust at least one of an output voltage or a current generated by each of the generators automatically based on data received from one or more of a look-up table and a map.

4. The locomotive consist control system of claim 2, wherein the lead controller is configured to supply instructions in the form of modulated, high bandwidth signals indicative of adjustments to rotor field currents of at least one of the generators associated with a locomotive to change electrical power output from the at least one generator to the power bus electrically connecting the at least one generator to the traction motor associated with the locomotive.

5. The locomotive consist control system of claim 2, wherein the lead controller is configured to supply instructions to dynamically adjust at least one of an output voltage or a current generated by each of the generators based on instructions received from an operator.

6. The locomotive consist control system of claim 2, wherein the lead controller is further configured to dynamically coordinate infinitely adjustable voltage outputs or current outputs from each generator to maintain a substantially constant puffing power generated by the consist.

7. The locomotive consist control system of claim 2, wherein the lead controller is configured to send a command for a particular one of the at least one trailing locomotive to isolate itself from the consist by going electrically offline when that particular one of the at least one trailing locomotive is not needed to meet the total electrical power output requirement for the consist.

8. The locomotive consist control system of claim 2, wherein the lead controller is further configured to determine the total electrical power output requirement for the consist based at least in part on upcoming track data.

9. The locomotive consist control system of claim 2, wherein the operating condition of each locomotive in the consist includes a fuel level for each locomotive.

10. The locomotive consist control system of claim 2, wherein the operating condition of each locomotive in the consist includes at least one of an age and a level of wear of each locomotive.

11. The locomotive consist control system of claim 7, wherein the secondary controller associated with the particular one of the at least one trailing locomotive that has isolated itself from the consist is configured to ignore any instructions from the lead controller and to commence automatic engine startup and shut-down based on instructions received from an automatic engine start-stop (AESS) system on the isolated trailing locomotive completely independently from any command received from lead controller.

12. A method of controlling a plurality of locomotives in a consist, the consist including a lead locomotive, a lead controller associated with the lead locomotive, at least one trailing locomotive, and at least one secondary controller associated with each of the at least one trailing locomotive, each locomotive including an engine, a generator, a traction motor, a power bus electrically connecting the generator to the traction motor, and a power bus electrical characteristics sensor for detecting at least one of voltage or current in the power bus, the method comprising:

receiving data at the lead controller from the power bus electrical characteristics sensor associated with each locomotive, the data including information on at least one of a voltage or a current being output by the generator associated with each locomotive;

determining by the lead controller a total electrical power output requirement for the consist;

determining by the lead controller an electrical power output requirement for each locomotive in the consist based at least in part on an operating condition of each locomotive in the consist and the data from the power bus electrical characteristics sensor associated with each locomotive and the total electrical power output requirement for the consist;

comparing the electrical power output requirement for each locomotive in the consist to the electrical power output requirement for other locomotives in the consist; and supplying instructions from the lead controller to dynamically adjust at least one of an output voltage or an output current generated by the generator associated with each locomotive to a desired voltage or current that may fall anywhere within a rated capacity of the generator based on the comparison.

13. The method of claim 12, wherein the lead controller supplies instructions to dynamically adjust at least one of an output voltage or an output current generated by each of the generators automatically based on data received from one or more of a look-up table and a map.

14. The method of claim 12, wherein the lead controller supplies instructions in the form of modulated, high bandwidth signals indicative of adjustments to rotor field currents of at least one of the generators associated with a locomotive to reduce electrical power output from the at least one generator to the power bus electrically connecting the at least one generator to the traction motor associated with the locomotive.

15. The method of claim 12, wherein the lead controller dynamically coordinates at least one of infinitely adjustable voltage outputs or current outputs from each generator to maintain a substantially constant pulling power generated by the consist.

16. The method of claim 12, wherein the lead controller sends a command for a particular one of the at least one trailing locomotive to isolate itself from the consist by going electrically offline when that particular one of the at least one trailing locomotive is not needed to meet the total electrical power output requirement for the consist.

17. The method of claim 12, wherein the lead controller determines the total electrical power output requirement for the consist based at least in part on upcoming track data.

18. The method of claim 12, wherein the operating condition of each locomotive in the consist includes a fuel level for each locomotive.

19. The method of claim 12, wherein the operating condition of each locomotive in the consist includes at least one of an age and a level of wear of each locomotive.

20. The method of claim 16, wherein the secondary controller associated with the particular one of the at least one trailing locomotive that has isolated itself from the consist ignores any instructions from the lead controller and commences automatic engine start-up and shut-down based on instructions received from an automatic engine start-stop (AESS) system on the isolated trailing locomotive completely independently from any command received from lead controller.

* * * * *

UNITED STATES PATENT AND TRADEMARK OFFICE
CERTIFICATE OF CORRECTION

| | | |
|---|---|---|
| PATENT NO. | : 8,924,052 B2 | Page 1 of 1 |
| APPLICATION NO. | : 13/789934 | |
| DATED | : December 30, 2014 | |
| INVENTOR(S) | : Melas et al. | |

It is certified that error appears in the above-identified patent and that said Letters Patent is hereby corrected as shown below:

In the specification

Column 3, line 60, delete "sensors" and insert -- sensors, --.

Signed and Sealed this
Seventeenth Day of November, 2015

Michelle K. Lee
*Director of the United States Patent and Trademark Office*